(12) United States Patent
Pong et al.

(10) Patent No.: US 6,349,147 B1
(45) Date of Patent: Feb. 19, 2002

(54) CHINESE ELECTRONIC DICTIONARY

(76) Inventors: Gim Yee Pong; Wai Jean Pong, both of 45-11 156th St., Flushing, NY (US) 11355

( * ) Notice: Subject to any disclaimer, the term of this patent is extended or adjusted under 35 U.S.C. 154(b) by 0 days.

(21) Appl. No.: 09/494,719

(22) Filed: Jan. 31, 2000

(51) Int. Cl.$^7$ .............................. G06K 9/18; G06K 9/62; H03K 17/94; G09G 5/00; G06F 15/00

(52) U.S. Cl. ................ 382/185; 382/187; 382/189; 382/202; 382/224; 382/229; 341/28; 345/171; 707/535; 707/536

(58) Field of Search ......................... 382/185, 186, 382/187, 189, 202, 181, 224, 225, 226, 229, 305; 341/28; 345/171; 707/535, 536, 3, 500, 509; 358/403

(56) References Cited

U.S. PATENT DOCUMENTS

| | | | | |
|---|---|---|---|---|
| 4,559,615 A | * | 12/1985 | Goo et al. ................ | 707/535 |
| 5,119,296 A | * | 6/1992 | Zheung et al. ............ | 707/535 |
| 5,212,769 A | * | 5/1993 | Pong ....................... | 345/467 |
| 5,236,268 A | * | 8/1993 | Chang ...................... | 400/484 |
| 5,360,343 A | * | 11/1994 | Tang ........................ | 434/118 |

OTHER PUBLICATIONS

Chou, et al "Sorting Qualities of Handwritten Chines Characters for Setting Up a Research Database", IEEE, pp. 474–477, Jul. 1993.*

Zheng, et al. "Reognizing On–Line Handwritten Chinese Character via FARG Matching", IEEE, pp. 621–624, Apr. 1997.*

* cited by examiner

Primary Examiner—Andrew W. Johns
Assistant Examiner—Daniel G. Mariam
(74) Attorney, Agent, or Firm—Cobrin & Gittes

(57) ABSTRACT

A method of finding a Chinese character in an electronic dictionary. The method includes sorting the characters in the dictionary into three groups according to stroke type: horizontal, vertical and slant, identifying which group a character belongs to based on the first writing stroke of the character, locating an original root of the Chinese character from the identified group based on a first three writing strokes of the Chinese character and finding the Chinese character in the dictionary based on the first three writing strokes of the Chinese character that immediately follow the strokes of the located original root.

5 Claims, 5 Drawing Sheets

| 組 \| Section Strokes From ROOT | 頁 Page | 部首 (字邊) ROOT |
|---|---|---|
| 〈三筆畫〉[一部] 引索部首 Three-Stroke Dictionary ( 一 ) Group ||||
| 一 | ><br>><br>><br>L |  |
| 一 一 | ><br>><br>><br>L | 二干三古无示(玉王)青 |
| 一 丨 | ><br>><br>><br>L | 十 |
| 一 丨 一 | ><br>><br>><br>L | 土士工老走赤鼓 |
| 一 丨 一 * | ><br>><br>><br>L | 匚匸匕臣黃革 |
| 乛 一 | ><br>><br>><br>L | 己尸弓韋聿隶 |
| 一 丨 乛 | ><br>><br>><br>L | 雨酉西車 |
| 一 丨 丿 * | ><br>><br>><br>L | 木才寸尸羽 |
| 乛 | ><br>><br>><br>L | 又子疋皮阝矛癶 |
| 一 丿 | ><br>><br>><br>L | 厂辰兀石歹至而面頁瓦豸 |
| 一 丿 * | ><br>><br>><br>L | 大犬尢廾牙麥飛 |

註：L 是字的位置 (X．Y)；X 由上至下，Y 由左至右，(X From top, Y from left). stroke with different form.
　一丨丿* 內有寫字畫分相同基本畫；* 一丨丿每字首的首畫．*

FIG. 1

| <三筆畫> [丨部] 引索部首 Three Stroke Dictionary (丨) Group | | |
|---|---|---|
| [組] Section Stroke form ROOT | 頁 Page | 部首 (字邊) ROOT |
| 丨 | > > > L | 丨 |
| 丨 - - | > > > L | 長馬彡門 |
| 丨 ㄱ - | > > > L | 口囗日曰足邑虫∗目見貝鼎∗田里黑∗黽骨門皿皿 |
| 丨 - ∗ | > > > L | 止支虍月韭鹵齒 |
| L 丨 | > > > L | 凵山屮艸 |
| 丨 ㄱ | > > > L | 冂巾肉网 |
| 丨 / ∗ | > > > L | 卜小水比 |
| 註: L是字的位置 (X . Y); X由上至下, Y由左至右. (X from Top, Y from left to right) - 丨 / ∗ 內有寫字畫分相同基本畫; ∗ - 丨 / 每字首的首畫; / ＼ # 多不同的 / ∗ Stroke with different form. | | |

FIG. 2

| <三筆畫> [ ／部 ] 引索部首 Three-Stroke Dictionary ( ／ ) Group |||
|---|---|---|
| [組] Section Stroke From ROOT | 頁 page | 部首(字邊) ROOT |
| ／ | ><br>><br>><br>L | ／ |
| ／ 一 | ><br>><br>><br>L | 二文立方辛衣言玄高音龍广疒麻鹿齊 |
| ／ フ | ><br>><br>><br>L | 一欠攵久夕舛色角魚龜 |
| ／ 一 * | ><br>><br>><br>L | 几非月用癶竹禾手毛毋香黍風月衤礻 |
| ／ 一 一 | ><br>><br>><br>L | 矢气缶牛生禾 |
| ／ ｜ * | ><br>><br>><br>L | 亻川片儿隹白自白阜血鬼身鳥鼠鼻 |
| ／ ＼ | ><br>><br>><br>L | 人入金食八谷 |
| ／ ／ * | ><br>><br>><br>L | 斤戶爪瓜彳行宀穴女 |
| ﹨ ／ | ><br>><br>><br>L | 羊米首斗氵 |
| ／ ／ * | ><br>><br>><br>L | 氵厶釆 |
| ／ ＼ # | ><br>><br>><br>L | 火父爻⺮犭幺心糸巛豸鬯 |
| 註：L是字的位置(X.Y); X由上至下，Y由左至右; (X from top, Y from left). *Stroke form different from original.<br>／＼# 多不同的／; -｜／* 内有寫字畫分相同基本畫; * - ｜／每字首的首畫 |||

FIG. 3

EXAMPLE 1: Find 洗.

Its strokes after ROOT 氵 are ノ 一 丨 indicated by example. In this case, after ROOT 氵 is also a ROOT 牛. 浩 whose strokes after its ROOT is also 牛.

This invention listed characters according to 一 丨 ノ stroke sequence, 浩 whose first writing stroke follow 牛 is 丨. 洗 whose stroke follow 牛 is ノ. So 浩 listed before 洗. 運 whose strokes also are ノ 一 丨, but they are indivual strokes of the same form in sequence.

濫 is listed under 一 丨 一 *. The strokes after 氵 are also 一 丨 一 as all characters listed, but in differentr form. * this indicates that the strokes and sequnce are the same.

Characters with 氵 are over 200, The list here is an example.

一 一 沅汗汙汪沫漬潔 一 丨 汁沽湖潮 一 丨 一 *江法潰渚澁澆濤濫
ノ 一 海汽 ノ 一 泣汝汴淬浩沆注涼漳潼淤液滂滴滸瀝灕澶瀛灣濼濟濠

ノ 一 丨 浩活    洗    運
              ：
              用
              水
              除
              去
              骯
              物

WASH THING WITH WATER

*FIG. 5*

CHINESE ELECTRONIC DICTIONARY

CROSS REFERENCE TO COPENDING PATENT APPLICATIONS

U.S. Ser. No. 09/340,174 which is now U.S. Pat. No. 6,219,448 is on Apr. 17, 2001 entitled Three-Stroke Chinese Dictionary, Patent Application, filed in the name of the same inventors.

BACKGROUND OF THE INVENTION

1. Field of the Invention

This invention relates to a method for finding characters in the Chinese dictionary, using electronic devices such as computer program.

2. Discussion of Related Art

The ROOT-TABLE is a list of simple, basic characters according to the number of strokes. It is the equivalent to the table of contents in a book.

To find a character in a Chinese dictionary in the traditional way:

1) Ascertain its traditional root (as the starting point) for the character to be searched.
2) Count the total strokes in the "ROOT", that is in the traditional root.
3) Go the ROOT-TABLE and look for the root in a group of roots that have the same number of strokes.
4) Go to page indicated by the root.
5) Count the number of strokes in the character body (strokes after the root).
6) Look for the character in the group of characters having the same number of strokes. This is where the character is located.

However, ascertaining the traditional root is the most difficult aspect when finding a character in the traditional way. Some characters have many roots, and can be anywhere, but there is only one dedicated root per character. Some characters have roots that are not recognizable and some roots have dual forms, such as:

Character 愛 has 4 roots with dedicated root (DRT) 心 which is deep inside the character body, 類 has 3 roots with DRT頁,部 has 3 roots with DR阝,妾 has 2 roots with DRT女, 並 with root unrecognizable: 手才 are dual form; 手 is the basic DRT.

The above examples illustrate the problem faced by traditional Chinese dictionary users. Because of this problem, Chinese scholars and educators introduced new methods for looking characters in early 1900, such as the FOUR CORNER and Phonetic Methods. The FOUR CORNER method uses a numerical number (0–9) to represent stroke type at each of the Four Corners. The Phonetic Method uses phonetic symbols instead of strokes. These methods have their shortcomings. Although the FOUR CORNER METHOD provides its users with 10 rules to interpret the type of strokes, the rules themselves need interpretations. The Phonetic symbols are not used in daily writing so they can be forgotten easily. These two systems have been used as supplements to the traditional ROOT-TABLE by some dictionaries currently in use.

The search for an easy way to find characters in a Chinese dictionary continues. Since November 1999, two articles in Sing Pao, a New York City Chinese newspaper, reported an over 70 years old Chinese, in south China, who spent more than 10 years cutting up characters in seven Chinese dictionaries and rearranged characters into 7 groups and strokes into 6 groups. So that characters can be found without knowing their traditional roots. He sent his discoveries to two universities in the City of CANTON for evaluation, and their comments were apparently favorable. U.S. patent application Ser. No. 09/340,174 (the 174 patent application) which is now U.S. Pat. No. 6,219,448 issued on Apr. 17, 2001 reveals the use of all traditional roots listed in the traditional ROOT-TABLE and the use of the writing root, which is the first root used in traditional Chinese hand writing. The present invention, however, does not make such a distinction; both the traditional root and the writing root will hereafter be referred to as a "ROOT".

Therefore, the strokes in these traditional Roots: 乙乚㇄ 支毋儿 刀刂力 阝戈弋 頁行艮 re not the starting strokes in handwriting and will no longer be listed in Root-tables for this invention. Users have to have a copy of patent application Ser. No. 09/340,174 which is now U.S. Pat. No. 6,219,448 issued on Apr. 17, 2001 in printed form before they can find characters they need. In contrast, the present invention envisions use the invention in the form of a computer program loaded in Windows 95 or Windows NT or accessed from a installation of the software code on a global computer network such as the Internet.

BRIEF DESCRIPTION OF THE DRAWING

FIG. 1 is a <-> Root-table.

FIG. 2 is a <|> Root-table.

FIG. 3 is a </> Root-table.

FIG. 5 is a schematic representation of a detail description of Example 1.

DETAILED DESCRIPTION OF THE INVENTION

Figure 4:
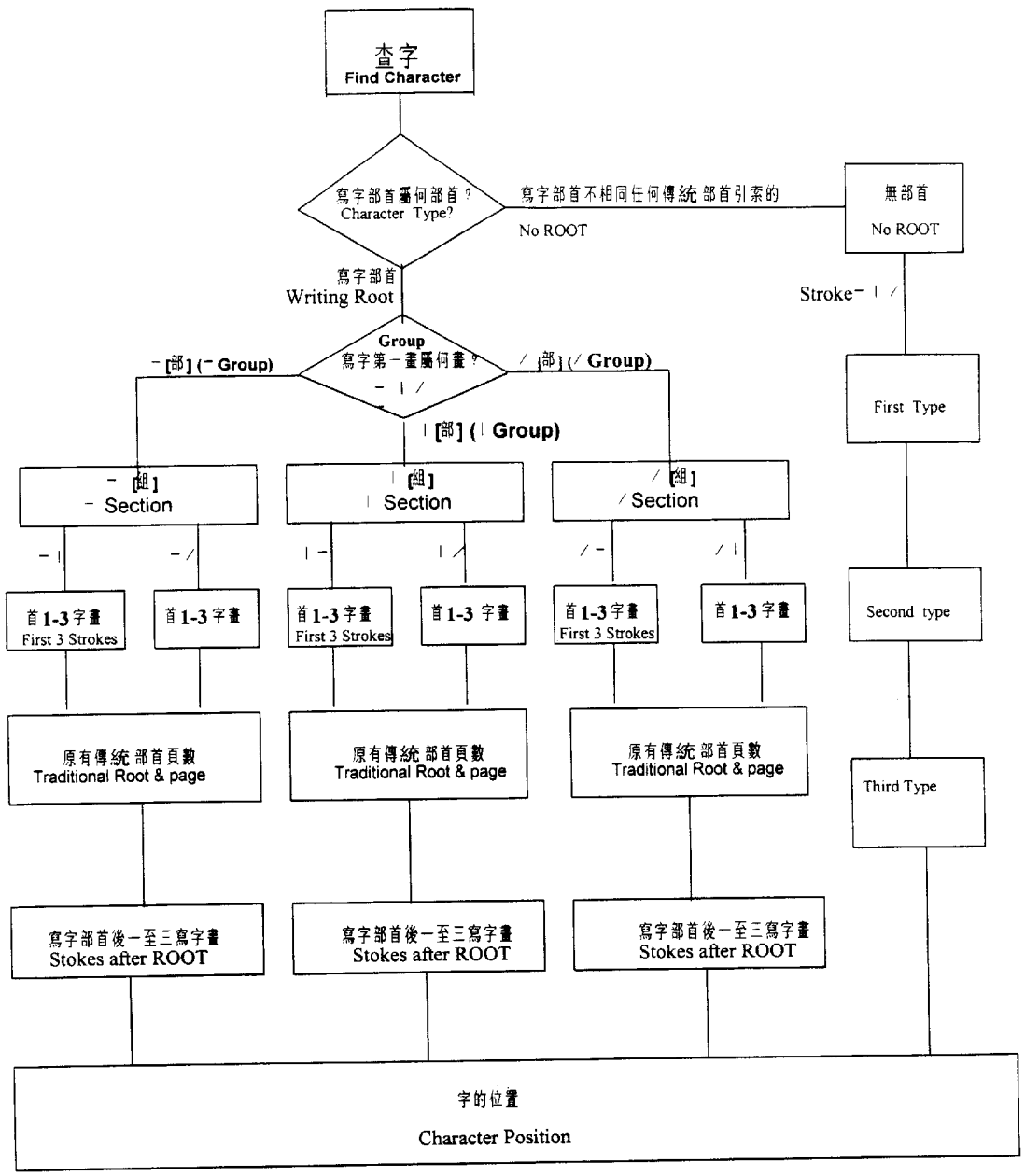
FIG. 4 is a Three-Stroke Typing Flow Chart.

The present invention categorizes or divides the characters in the Chinese dictionary into three Groups with modifications: <->, <|>, and </> groups. Each group has its own associated Root-table. The <-> Root-table lists all Roots that begin with horizontal strokes (-) as presented in FIG. 1. The <|> Root-table lists all Roots that begin with vertical strokes (1) as presented in FIG. 2. The </>[ R]oot-table list all Roots that begin with slant strokes (/) as presented in FIG. 3. This enables its users to locate the character more easily.

FIG. 4 shows a flow chart of the three strokes dictionary. The first three writing strokes; in most characters, can reveal its form during writing. This invention uses the first three (1–3) writing strokes in the "ROOT" and the next three (1–3) strokes that immediately follow the "ROOT". Characters whose starting strokes are not in the form of the "ROOT" are classified as a NON-ROOT or <XX> characters (they are equivalent to "HARD TO FIND CHARACTERS" in the traditional dictionary). To find these characters, use the beginning strokes and the <XX> Table instead of using "ROOT".

The three (1–3) strokes immediately following the ROOT can be other ROOT or individual strokes. Regardless of what they are, it is a combination of the strokes from the Chinese alphabet below:

```
<-筆畫>:  ⼀  ㄱ  ㄱ  ㄱ  ㄱ  ㄱ  ㄱ
<|筆畫>:  |  L  L  J  l  ㄣ
</筆畫>:  /\  )  ノ  ノ  ヽ  ヽ  乚  \  )  )  <  ㄣ
```

The number of characters listed under a given ROOT (traditional root) varies. The characters formed with ROOT (HAND) are over 200 in a dictionary of 4500 characters. While ROOT (BONE) has 8 characters (below). Those ROOTS with a small population (under 10 characters) will not be listed according to actual strokes. Instead, the strokes -*,|*,/* are used. This indicates that the character following -* starts with - stroke, etc, see example that follows. Those ROOTS with large populations and the strokes after the ROOT have different forms. The strokes -|*, -* ,/|* are used instead of listing them according to their actual strokes. In short, an asterisk * after a given stroke group (-|/) indicates that starting strokes and the sequence are the same, but not all of them are in their actual form.

Example: Characters listed under ROOT (BONE 骨):

a) 4strokes 骯 5 stroke 骷 6 strokes 骸骼 11 strokes 髏 13 strokes 髒髓體. This is the traditional way of listing, by number of strokes, with the smallest one listed first.
b) -*骯骷, |*髒腰體, /*骯骸骼. This is the present inventive way of listing by -|/ sequence.

Although actual strokes are not used, desired characters can be found easily, because characters in this dictionary are listed according the stroke sequence (-|/). A detail listing is not always necessary, unless its population is very large.

The first three (1–3) writing strokes used by this invention

Based on the first (1–3) strokes in the "ROOT", find the "SECTION" for the character and its traditional Root (ROOT) as well as the page number in the dictionary; based on the (1–3) strokes immediately following the "ROOT", find the location where the character is located. To find a character, the user has to:

1) Find the Root-table icon with the same starting stroke as the character's starting stroke.
2) From the left column on the Root-Table, Look for strokes (1–3) as the character's starting writing strokes
3) Look ac ross the page for the "ROOT", the original traditional root for the character as well as the page number and its location (indicated by L x, y from top and from left to right). An original traditional root is a root listed in a Chinese traditional dictionary ROOT-TABLE and is designated as THE ROOT for the character in question.
4) Go to that page, and look (from the left) for three (1–3) writing strokes that correspond to the strokes immediately following the "ROOT", the WRITING ROOT.

3-STROKES TABLE

| # of Strokes from Root | Strokes immediately follow ROOT (Not listed if in ROOT form) | # of Strokes from Variable |
|---|---|---|
| FOR <⁻> Group | | |

<⁻> "ROOT"

| 示千舌无玉青 | 2 | — — | | | |
| 十 | 2 | — \| | | | |
| 土士工 | 3 | — \| — | | | |
| 己尸聿隶 | 2 | ㄱ — | | | |
| 鬥酉車 | 3 | — \| ㄱ | | | |
| 木 | 3 | — \| / | 寸才 | 3 | — \| /* |
| 又子阝 | 1 | — / | 刀力王 | 2 | — /* |
| 厂石面豕辰 | 3 | — / | | | |

FOR <\|> Group

<\|> "ROOT"

| 長彡馬 | 3 | \| — — |
| 虍韭止 | 2 | \| — |
| 口日貝田門皿 | 3 | \| ㄱ — |
| 山屮屮 | 2 | \| L |
| 冂巾肉 | 2 | \| ㄱ |

FOR </> Group

</>

| 一文立龍 | 2 | ヽ — |
| 广疒鹿 | 3 | ヽ — / |
| 禾竹 | 2 | / — |
| 生矢缶牛 | 3 | / — — |
| 亻住白自白鬼鳥身氏阜片* | 2 | / \| |
| 人金食八谷 | 2 | / \ |
| 斤戶爪彳⺈ | 2 | / /* |
| 羊米首斗 | 3 | ヽ / — * |
| 火父爻⺮扌幺心糸 | x | / * \ | 3 or more / |

Practical Application Of, This Invention.

This invention uses the original concept developed by the '174 patent application with modifications by deleting ROOTS whose first stroke are not used in handwriting.

To find a character:

1) Click the icon with the same type of stroke as the first stroke in the character. The ROOT-TABLE pops-up.
2) Scroll the cursor down through the ROOT-TABLE to where three (1–3) strokes correspond to the first three strokes of the "ROOT".
3) Search across the ROOT-TABLE until the ROOT for the character is found (the page number with and its location L (x, y) for this Root is listed here).
4) Click the ROOT and then the page pops-up.
5) Scroll the cursor down through the page to where strokes (1–3) correspond to the first strokes (1–3) immediately following the WRITING ROOT until the character is found. FIG. 5 shows Example 1: find 沈.

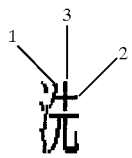

This character can be found in two ways.
1) A regular dictionary user knows that its root is 水. The handwriting rules state that for a character with symmetrical strokes on both sides, the center stroke 丨 starts first. The <|> ROOT-TABLE is therefore clicked first and then scrolled down to find 水 and its associated page number.
2) An occasional user can find it without knowing its original root 水.
   A) The strokes 氵 that are normally written are used, which first stroke is 丶. By definition, all uni-directional strokes, (/ \ 丿 ' 丶 丶 乀) are basic strokes /.
   B) The </>ROOT-TABLE clicked first and the scrolled down the page. The page here is the same page used by first user, because both roots are the same root.
   C) The page is clicked to list all characters whose traditional root 水 pops-up.
   D) Scrolling is effected until the strokes immediately following the "ROOT", which is identified by 1, 2 and 3, are found.
   E) Look across the page until the character is found.
   F) If desired, the character may be down loaded by high-lighting it.

Example 2: Find 都.

1) Its "ROOT" 土 need not be known. Its first stroke for this character 都 is -. The user clicks the <-> Root-table of FIG. 2.
2) <-> Root-table pops-up.
3) Scroll down the Table until the same strokes as the "ROOT"(⊢ )and its page are found.
4) Click the page so that all listed characters with 土 pop-up.
5) Scroll the page until strokes (1=/, 2=|, 3=㇇) immediately following the "ROOT" are found.
6) Look across the page until the character is found.

Example 3: Find 愛.

1) The starting stroke for 愛 is /. The user clicks the </> Root-table.

2) </> Root-Table of FIG. 3 pops-up.
3) Scroll down the Table until the same strokes (///) as in the "ROOT" and its page are found.
4) Click the page so that all listed characters with z,34 pop-up.
5) Scroll the page until strokes (1=', 2=㇇) immediately following the "ROOT" are found.
6) Look across the page until the character is found.
7) Although 心 is the traditional root, it is not used to find this character, Example 4: Find 福

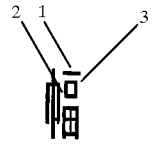

1) This first stroke for 福 is |.
2) The user clicks the <|> Root-table of FIG. 2.
3) <|> Root-Table pops-up.
4) Scroll down the Table until the same strokes (巾 as in the "ROOT" and its page are found.
5) Click the page so all listed characters with 巾 pop-up.
6) Scroll the page until strokes (1=, -2=|, 3㇇) immediately following the "ROOT" are found.
7) Look across the page until the character is found.

Example 5: Find 並
1) This character 並 whose "ROOT" is unrecognizable.
2) To find characters with unrecognizable root, The <XX> Table will be used.
3) The user clicks the <XX > Table.
4) The fist stroke in 並 is /. Look through the </> section on the <XX> Table until 並 the character is found_

While the foregoing description and drawings represent the preferred embodiments of the present invention, it will be understood that various changes and modifications may be made without departing from the spirit and scope of the present invention.

What is claimed is:

1. A method of finding a Chinese character in a dictionary containing
   a plurality of Chinese characters, comprising the steps of:
      sorting the Chinese characters in the dictionary into three groups according to stroke type:
         horizontal (-) stroke,
         vertical (|) stroke; and
         slant (/) stroke;
      identifying which of the groups (-), (|) or (/) the Chinese character belongs to based on a first writing stroke of the Chinese character;
      locating an original root of the character from the identified group based on a first three writing strokes of the Chinese character; and
      finding the Chinese character in the dictionary based on a first three writing strokes that immediately follow the strokes of the located original root.

2. A method as in claim 1, further comprising the step of carrying out the finding of the Chinese character over a global computer network.

3. A method as in claim 2, further comprising downloading the Chinese character that was found.

4. A method as in claim 1, further comprising carrying out the step of identifying by clicking an icon with a same type of stroke in a first stroke in the Chinese character, carrying out the step of locating by scrolling a cursor through a display of a root-table to where the three strokes correspond to the first three strokes of the original root, searching across the root table until the original root for the character is found, and clicking the original root to the step of finding being carried out by scrolling the cursor through a page where three strokes correspond to the first three strokes that immediately follow the strokes of the original root until the Chinese character is found.

5. An apparatus to find a Chinese character in a dictionary that contains a plurality of Chinese characters, comprising:

a database that categorizes the Chinese characters into three groups according to stroke type:
  horizontal (-) stroke, vertical (|) stroke, and slant (/) stroke;
  of which group (-), (|), or (/) the character belongs to based on a first writing stroke;

locating an original root of the character from the group that the character belongs based on a first three writing strokes and finding the character based on a first three writing strokes that low the strokes of the original root.

* * * * *